United States Patent
Itoo et al.

(10) Patent No.: US 9,849,781 B2
(45) Date of Patent: Dec. 26, 2017

(54) UTILITY VEHICLE

(71) Applicant: KAWASAKI JUKOGYO KABUSHIKI KAISHA, Hyogo (JP)

(72) Inventors: Seiji Itoo, Akashi (JP); Shinichi Tanaka, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 136 days.

(21) Appl. No.: 14/585,614

(22) Filed: Dec. 30, 2014

(65) Prior Publication Data

US 2016/0185218 A1 Jun. 30, 2016

(51) Int. Cl.
| B60R 25/10 | (2013.01) |
| B60Q 1/00 | (2006.01) |
| B60Q 1/22 | (2006.01) |
| B60Q 1/26 | (2006.01) |
| B60K 28/14 | (2006.01) |
| B60K 17/34 | (2006.01) |
| B60K 28/00 | (2006.01) |

(52) U.S. Cl.
CPC .............. B60K 28/14 (2013.01); B60K 17/34 (2013.01); *B60K 2028/003* (2013.01)

(58) Field of Classification Search
CPC .............. B60G 17/0162; B60G 17/019; B60G 2400/102; B60G 2600/04; B60G 2600/08; B60G 2800/012; B60G 2800/24; B60G 2800/70; B60G 2800/9124; B60K 28/10; B60R 2021/0018; B60R 21/013; B60R 25/018; B60R 25/04; B60R 25/1004; B60R 25/21; B60T 2230/03; B60T 8/17554; B60W 10/06; B60W 10/184; B60W 2520/10; B60W 2520/125; B60W 2520/18
USPC .......................... 340/429, 436, 438, 440, 463
See application file for complete search history.

(56) References Cited

U.S. PATENT DOCUMENTS

| 5,610,575 | A | * | 3/1997 | Gioutsos | ............ | B60G 17/0162 180/282 |
| 6,654,671 | B2 | * | 11/2003 | Schubert | ............. | B60R 21/0132 180/252 |
| 6,711,399 | B1 | * | 3/2004 | Granier | ................. | B60R 25/102 340/426.16 |
| 8,086,376 | B2 | * | 12/2011 | McCoy | ............... | B60R 21/0134 340/440 |
| 2005/0015191 | A1 | * | 1/2005 | Banno | ..................... | B60T 8/175 701/70 |

(Continued)

*Primary Examiner* — Emily C Terrell
(74) *Attorney, Agent, or Firm* — Wenderoth, Lind & Ponack, L.L.P.

(57) ABSTRACT

A utility vehicle includes a diesel engine, a two-four wheel drive switcher provided on a driving power transmission path from the diesel engine and configured to switch transmission of driving power to driving wheels between a two-wheel drive mode and a four-wheel drive mode, and a vehicle control unit configured to control the two-four wheel drive switcher. The utility vehicle further includes a rollover sensor configured to detect rollover of the utility vehicle, and a fuel cutoff valve configured to cut off fuel supply to the diesel engine. The vehicle control unit determines whether or not the utility vehicle is being rolled over in accordance with detection by the rollover sensor and controls the fuel cutoff valve to cut off the fuel supply when the vehicle control unit determines that the utility vehicle is being rolled over.

3 Claims, 10 Drawing Sheets

(56) References Cited

U.S. PATENT DOCUMENTS

| | | | |
|---|---|---|---|
| 2006/0025897 A1* | 2/2006 | Shostak | B60C 23/005 701/1 |
| 2006/0064218 A1* | 3/2006 | Subbian | B60R 21/0132 701/45 |
| 2009/0053943 A1* | 2/2009 | Fink | H01R 4/022 439/876 |
| 2009/0096286 A1* | 4/2009 | Buck | B60L 3/04 307/10.7 |
| 2010/0324774 A1* | 12/2010 | Bouni | B60R 21/0152 701/31.4 |
| 2013/0179042 A1* | 7/2013 | Katz | B60R 21/0132 701/46 |
| 2014/0188347 A1* | 7/2014 | Tabe | B60R 21/0152 701/45 |

* cited by examiner

UTILITY VEHICLE

BACKGROUND OF THE INVENTION

Field of the Invention

The present invention relates to a utility vehicle, and particularly to a utility vehicle including a diesel engine.

Description of the Related Art

There has been conventionally known a utility vehicle including a diesel engine. Such a diesel engine mounted to a utility vehicle is mechanically supplied with fuel by a fuel injection pump that is driven and rotated directly by rotation of a crank shaft, is mechanically adjusted an amount of the supplied fuel by a centrifugal spark advancer, and is ignited by compressed self-ignition. In short, an engine of this type is not electronically controlled and does not include any engine control unit (ECU).

An engine of this type is thus stopped by cutoff of fuel supply to the fuel injection pump, and includes a stop solenoid configured to cut off fuel supply to the fuel injection pump.

The stop solenoid is provided on a fuel supply path from a fuel tank to the fuel injection pump and is shifted to a retreating position where the fuel tank and the fuel injection pump communicate each other and a projecting position where fuel supply to the fuel injection pump is cut off, in accordance with operation of turning ON and OFF a main switch. Specifically, as shown in FIG. 10A, the stop solenoid includes a hold coil and a pull coil and is located at the projecting position while provided with no electricity.

When the main switch is turned ON, electricity is provided to both the hold coil and the pull coil and the stop solenoid is shifted from the projecting position to the retreating position by electromagnetic force of the pull coil and is kept at the retreating position by electromagnetic force of the hold coil. After the main switch is turned ON and a predetermined period elapses, an off timer cuts off provision of electricity to the pull coil. More specifically, when the main switch is turned ON, the stop solenoid is shifted to the retreating position and the fuel supply path between the fuel tank and the fuel injection pump is communicated, so that the fuel injection pump is supplied with fuel.

In order to stop the engine, provision of electricity to the hold coil is stopped so that the stop solenoid is shifted to the projecting position. Fuel supply to the fuel injection pump is thus cut off and the engine is stopped.

In order to stop the engine upon rollover of a vehicle, as shown in FIG. 10B, there are required a rollover sensor configured to detect rollover of a vehicle, a timer configured to count a predetermined period while the rollover sensor continuously detects rollover, and a relay configured to cut off provision of electricity to the hold coil if the timer has counted the predetermined period.

It is thus necessary to secure location spaces for electrical equipment such as the rollover sensor, the timer, and the relay. Such location spaces for the electrical equipment cannot be easily secured in a utility vehicle and the electrical equipment has limited location flexibility. Increase in number of components results in increase in number of assembling steps and increase in cost for the components.

SUMMARY OF THE INVENTION

The present invention has been made in view of the problems mentioned above, and an object thereof is to provide a utility vehicle that can suppress increase in number of electrical equipment components and can stop a diesel engine when the vehicle rolls over.

In order to achieve the object, the present invention provides a utility vehicle including a diesel engine, a two-four wheel drive switcher provided on a driving power transmission path from the diesel engine and configured to switch transmission of driving power to driving wheels between a two-wheel drive mode and a four-wheel drive mode, and a vehicle control unit configured to control the two-four wheel drive switcher, the utility vehicle further including: a rollover sensor configured to detect rollover of the utility vehicle; and a fuel cutoff valve configured to cut off fuel supply to the diesel engine; wherein the vehicle control unit determines whether or not the utility vehicle is being rolled over in accordance with detection by the rollover sensor and controls the fuel cutoff valve to cut off the fuel supply when the vehicle control unit determines that the utility vehicle is being rolled over.

The above configuration enables the vehicle control unit to halt the engine when the utility vehicle rolls over. This configuration does not require any of a relay, a timer, and the like, thus can suppress increase in number of electrical equipment components to reduce location spaces for the electrical equipment components and improve location flexibility for the electrical equipment components, and achieves cost reduction.

The utility vehicle preferably has any of the following configurations.

(1) The vehicle control unit is accommodated at an upper portion in a front chamber that has a top covered with a hood and right and left sides surrounded with right and left front fenders, and the rollover sensor is located adjacent to the vehicle control unit.

In the configuration (1), the vehicle control unit is located in the front chamber which a periphery thereof is surrounded. The vehicle control unit can thus be protected from peripheral foreign matters particularly in a utility vehicle that is likely to travel on an unpaved road and kick up water, mud, sand, dust, and the like from the road surface. Furthermore, the rollover sensor is located adjacent to the vehicle control unit in this configuration. This location enables compact wiring between the rollover sensor and the vehicle control unit.

(2) The utility vehicle further includes a seat belt sensor configured to detect that an on-board crew does not fasten a seat belt, and the vehicle control unit does not start the engine of the utility vehicle when the seat belt sensor detects that the seat belt is not fastened.

In the configuration (2), the utility vehicle does not allow the engine to start if the seat belt is not fastened, so that the utility vehicle cannot travel when the seat belt is not fastened.

DETAILED DESCRIPTION OF THE INVENTION

FIGS. 1 to 9 each show a utility vehicle according to an embodiment of the present invention. The embodiment of the present invention will now be described with reference to these figures. For easier description, assume that the utility vehicle travels "forward" with respect to the utility vehicle and respective components, and right and left sides of a crew correspond to "right and left sides" of the utility vehicle and the respective components.

First Embodiment

[Entire Configuration of Utility Vehicle]

Figure 1:
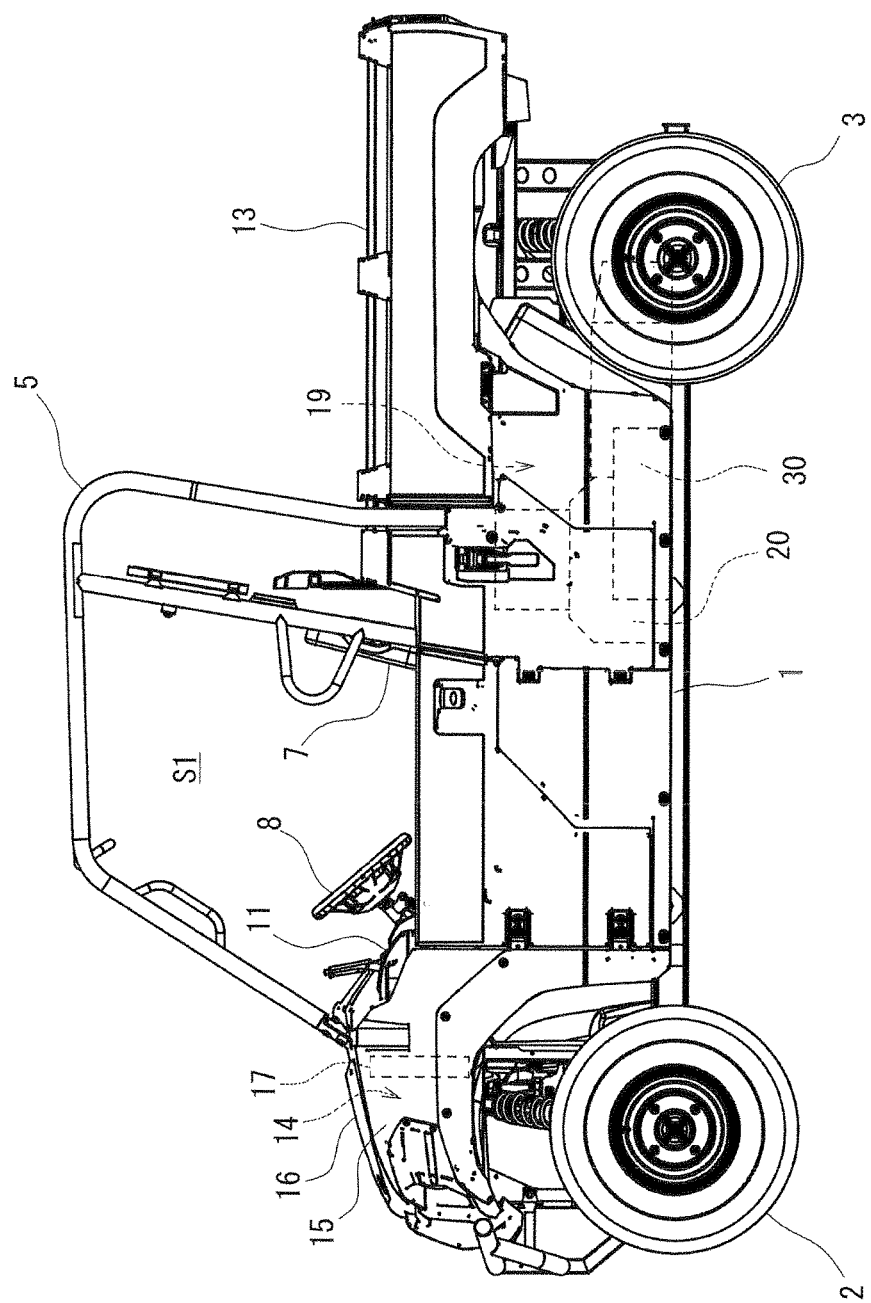
FIG. 1 is a left side view of a utility vehicle according to an embodiment of the present invention.

FIG. 1 is a left side view of the utility vehicle. The utility vehicle includes a chassis frame 1, right and left front wheels 2 provided at the front end of the chassis frame 1, and right and left rear wheels 3 provided at the rear end of the chassis frame 1. A riding space S1 is provided between the front wheels 2 and the rear wheels 3 in the anteroposterior direction, and is surrounded with a R.O.P.S. 5. The riding space S1 accommodates a front bench seat 7 and has a dashboard 11 at the front end. The R.O.P.S. is an abbreviation for a rollover protective structure.

Right and left front fenders 15 and a hood 16 are provided ahead of the dashboard 11. A dump truck type carrier 13 is provided behind the riding space S1.

An engine room 19 is provided below the carrier 13. The engine room 19 accommodates an engine 20 and a drive unit 30 configured to transmit driving power from the engine 20 decelerated by a predetermined speed reduction ratio to the front and rear wheels 2 and 3.

[Configurations of Engine and Drive Unit]

Figure 2:
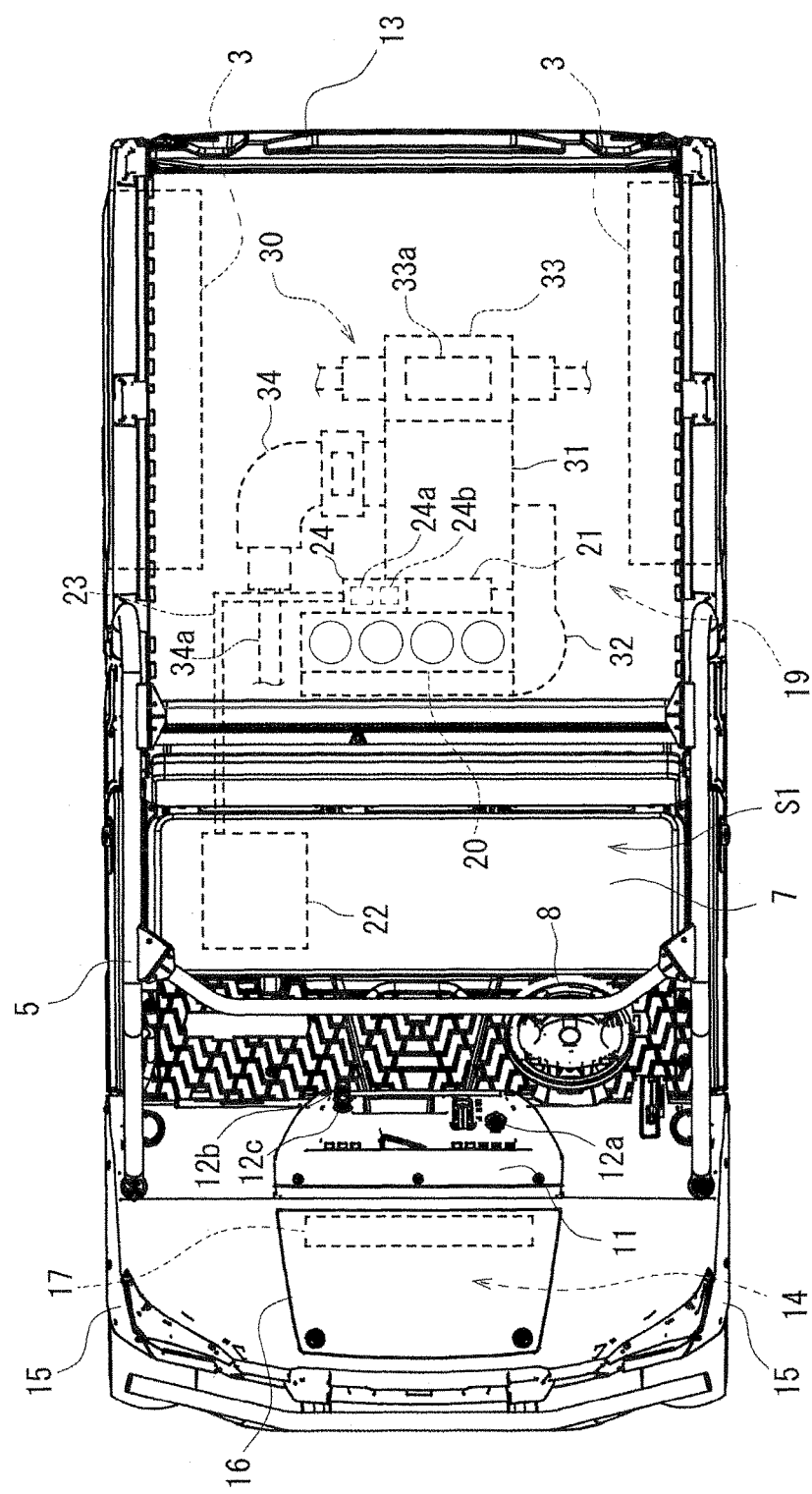
FIG. 2 is a top view of the utility vehicle shown in FIG. 1.

FIG. 2 is a top view of the utility vehicle. The dashboard 11 is provided with a steering wheel 8, a main switch 12a configured to start or stop the engine 20, a differential lock switch 12b configured to lock a differential device 33 to be described later, and a two-four wheel drive selector switch 12c configured to switch a drive mode between a two-wheel drive mode of driving only with the rear wheels 3 and a four-wheel drive mode of driving with both the front wheels 2 and the rear wheels 3.

The drive unit 30 includes a transmission 31 located behind the engine 20, a V-belt continuously variable transmission 32 located on the left of the engine 20 and the transmission 31, the differential device 33 located behind the transmission 31, and a two-four wheel drive switcher 34 located on the right of the transmission 31.

The engine 20 is a diesel engine of the inline type having a plurality of cylinders and a crank shaft extending in the vehicle width direction. The engine 20 includes a fuel injection pump 21 configured to be driven and rotated directly by rotation of the crank shaft, and a stop solenoid 24 (fuel cutoff valve) provided on a fuel supply path 23 from a fuel tank 22 to the fuel injection pump 21.

The stop solenoid 24 is configured to be shifted to a retreating position where the fuel tank 22 and the fuel injection pump 21 communicate each other through the fuel supply path 23 and a projecting position where fuel supply from the fuel tank 22 to the fuel injection pump 21 is cut off. The stop solenoid 24 includes a pull coil 24a and a hold coil 24b, and is located at the projecting position while electricity is not provided to the stop solenoid 24. When electricity is provided, the stop solenoid 24 is shifted to the retreating position by electromagnetic force of the pull coil 24a and is kept at the retreating position by electromagnetic force of the hold coil 24b.

The transmission 31 receives driving power of the crank shaft of the engine 20 through the V-belt continuously variable transmission 32, decelerates the driving power by the predetermined speed reduction ratio, and transmits the decelerated driving power to the rear wheels 3 through the differential device 33 as well as to the front wheels 2 through the two-four wheel drive switcher 34.

The V-belt continuously variable transmission 32 decelerates driving power of the engine 20 by the predetermined speed reduction ratio and transmits the decelerated driving power to the transmission 31.

The differential device 33 distributes the driving power decelerated by the predetermined speed reduction ratio by the transmission 31 to the right and left rear wheels 3 in accordance with loads. The differential device 33 is provided with a differential locking device 33a that fixes a distribution rate of driving power to the right and left rear wheels 3.

The two-four wheel drive switcher 34 is configured to switch between the four-wheel drive mode of driving the front wheels 2 by transmitting driving power from the transmission 31 to a propeller shaft 34a for driving front wheels in addition to the regularly driven rear wheels 3 and the two-wheel drive mode of driving only the rear wheels 3 without transmitting driving power from the transmission 31 to the propeller shaft 34a.

[Configuration of Electrical Equipment Storage Box]

Figure 3:
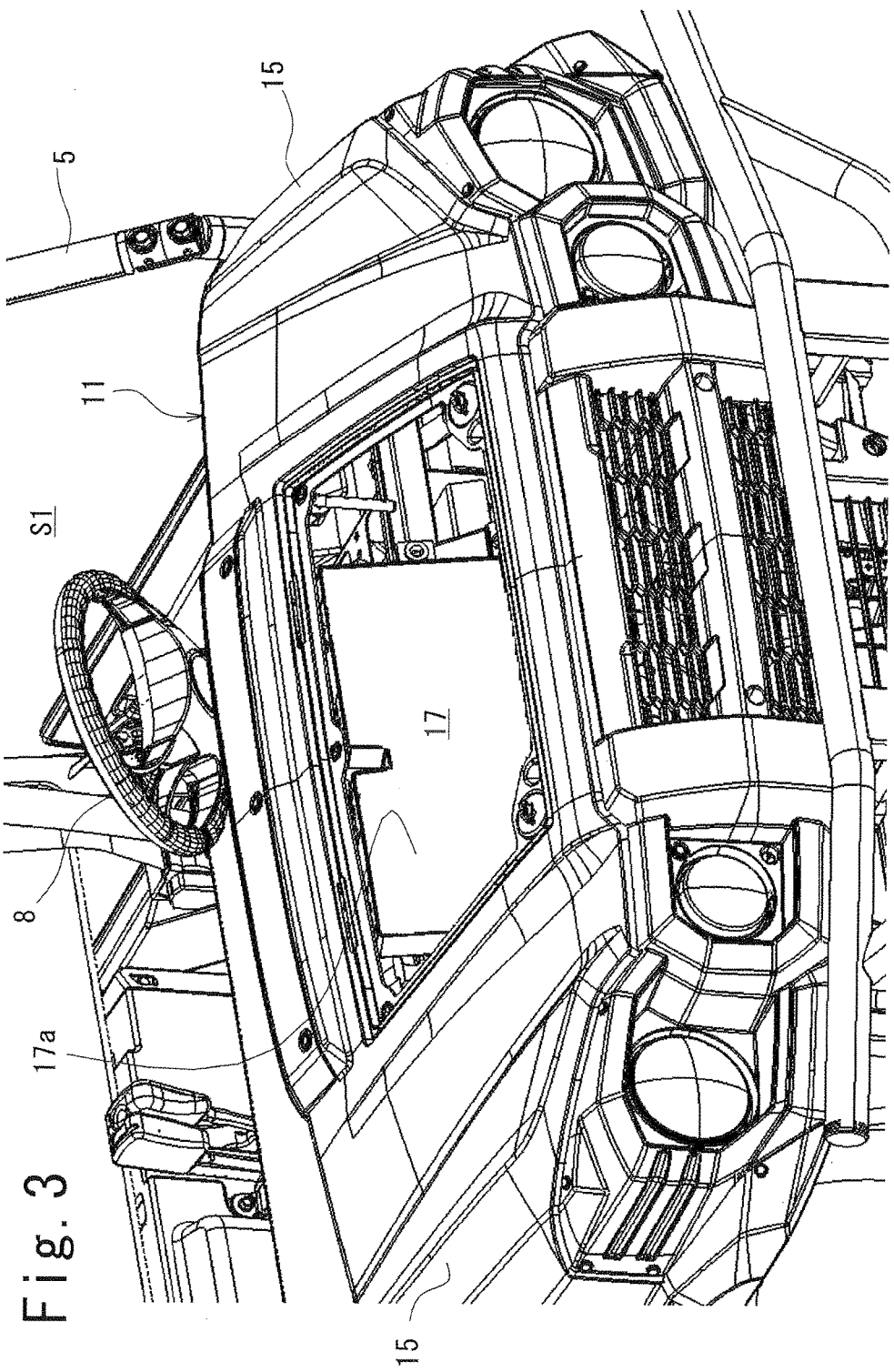
FIG. 3 is a perspective view of a front portion of the utility vehicle shown in FIG. 1.

As shown in FIG. 1, a front chamber 14 provided below the hood 16 accommodates an electrical equipment storage box 17 storing various electrical equipment. FIG. 3 is a perspective view of a front portion of the utility vehicle with the hood 16 being detached. The electrical equipment storage box 17 is located at an upper portion in the front chamber 14 that has the top covered with the hood 16 (see FIG. 1) and the lateral sides covered with the right and left front fenders 15, so as to protect various electrical equipment components 41 to 49 (see FIG. 4) accommodated therein from foreign matters such as water, mud, sand, and dust.

Figure 4:
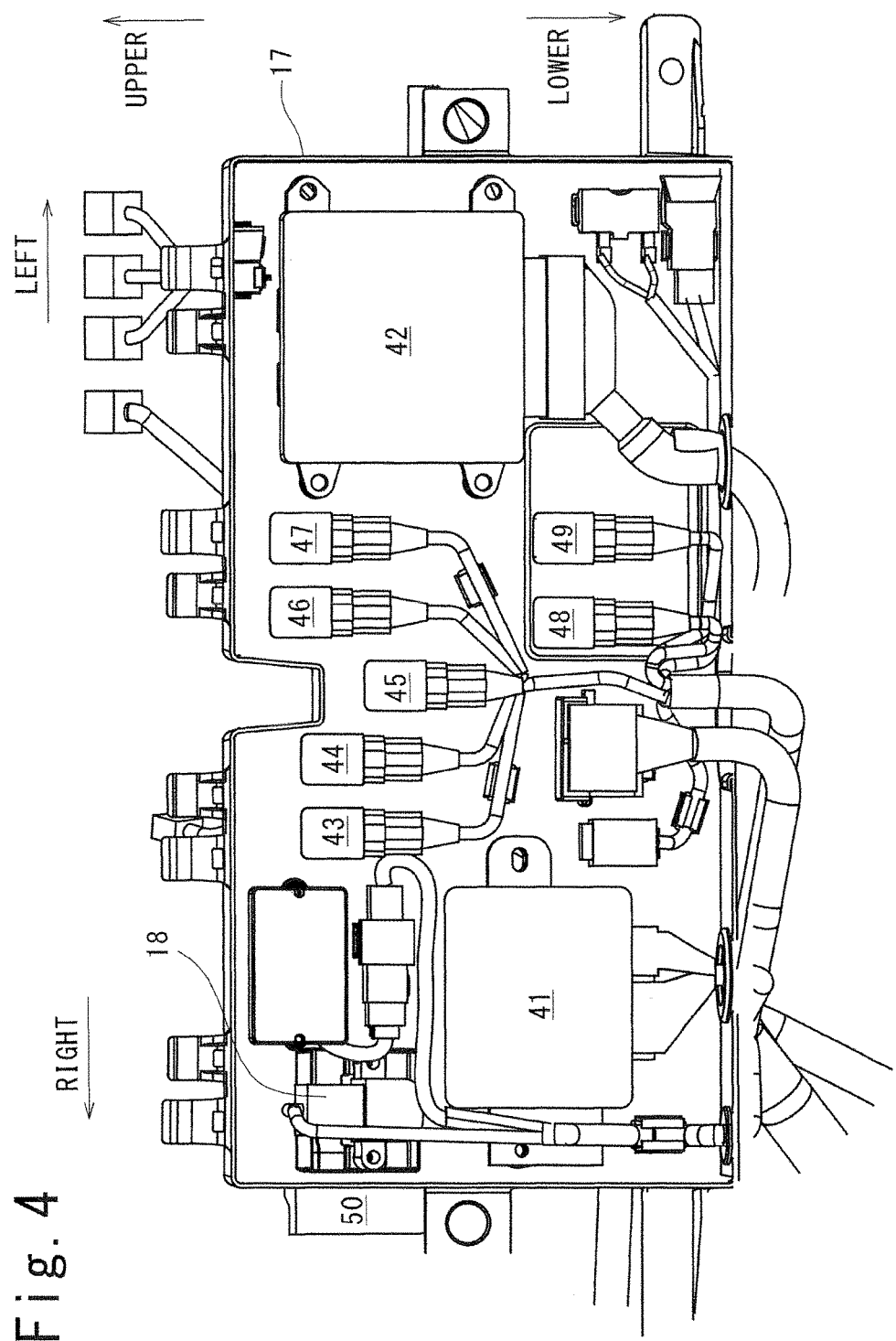
FIG. 4 is a front view of an electrical equipment box.

FIG. 4 is a front view of the electrical equipment storage box 17 with a front cover 17a (see FIG. 3) being detached so as to show the inside. The electrical equipment storage box 17 accommodates the various electrical equipment components 41 to 49, including control units such as an EPS control unit 41 configured to control electric power steering and a highland control unit 42 configured to control a fuel injection amount at highlands, as well as an accessory relay 43, a starter relay 44, a fan motor relay 45, a fuel pump relay 46, a glow plug relay 47, a solenoid driver relay 48, and a stop solenoid relay 49.

A rollover sensor 18 is accommodated at an upper right portion in the electrical equipment storage box 17. The rollover sensor 18 is configured to detect slant of the utility vehicle at a predetermined angle or more, and outputs an ON signal when detecting slant at the predetermined angle or more.

Figure 5:
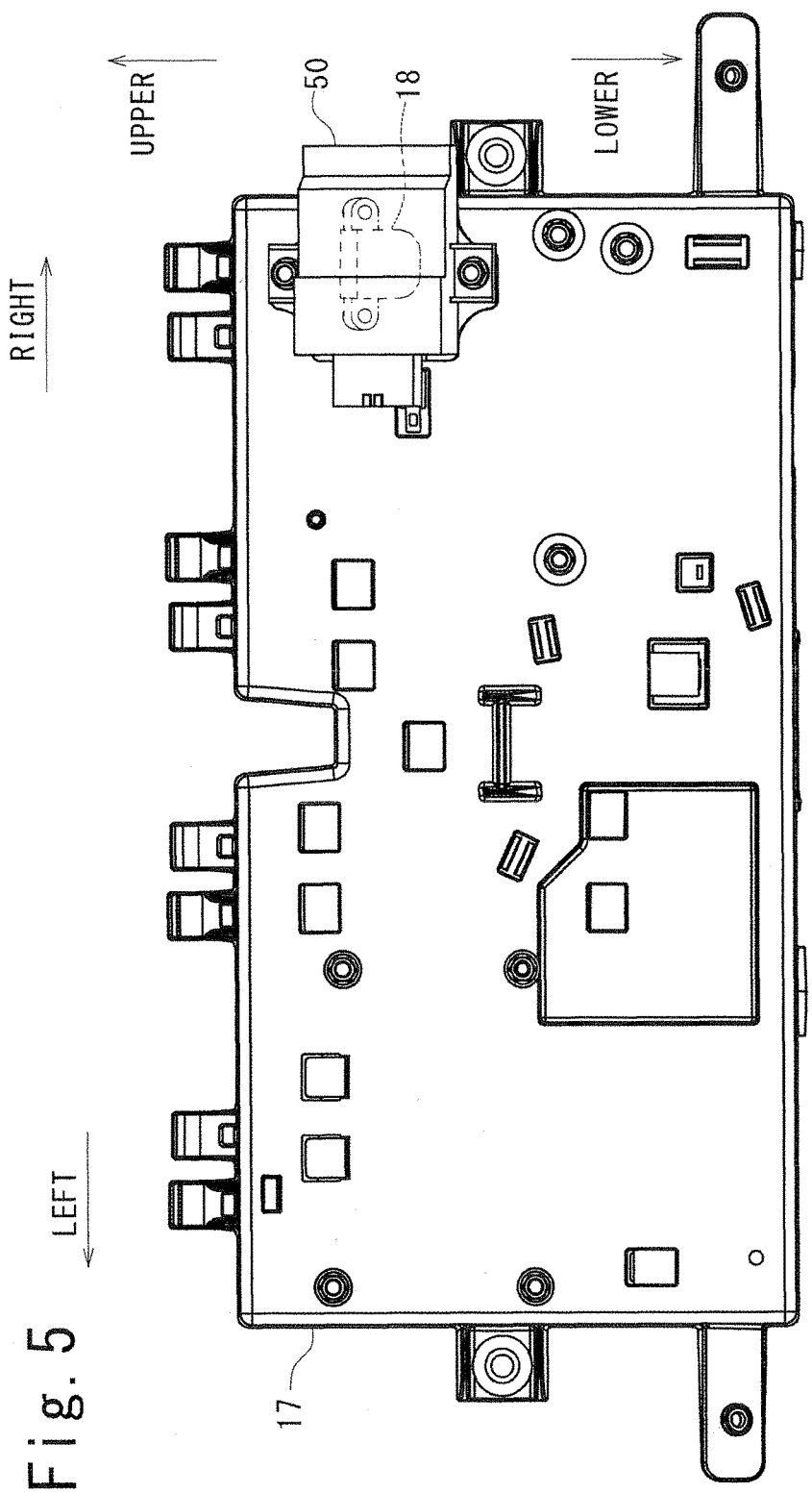
FIG. 5 is a rear view of the electrical equipment box.

FIG. 5 is a rear view of the electrical equipment storage box 17. A vehicle control unit (VCU) 50 configured to mainly control the drive unit 30 (see FIG. 1) is attached to an upper right portion of the electrical equipment storage box 17. The VCU 50 is not accommodated in the electrical equipment storage box 17 but is waterproof so as to be protected from water. More specifically, the VCU 50 and the rollover sensor 18 are located adjacent to each other on the front and rear surfaces of the electrical equipment storage box 17, so that the VCU 50 and the rollover sensor 18 are connected to each other by compact wiring.

[Configuration of VCU]

Figure 6:
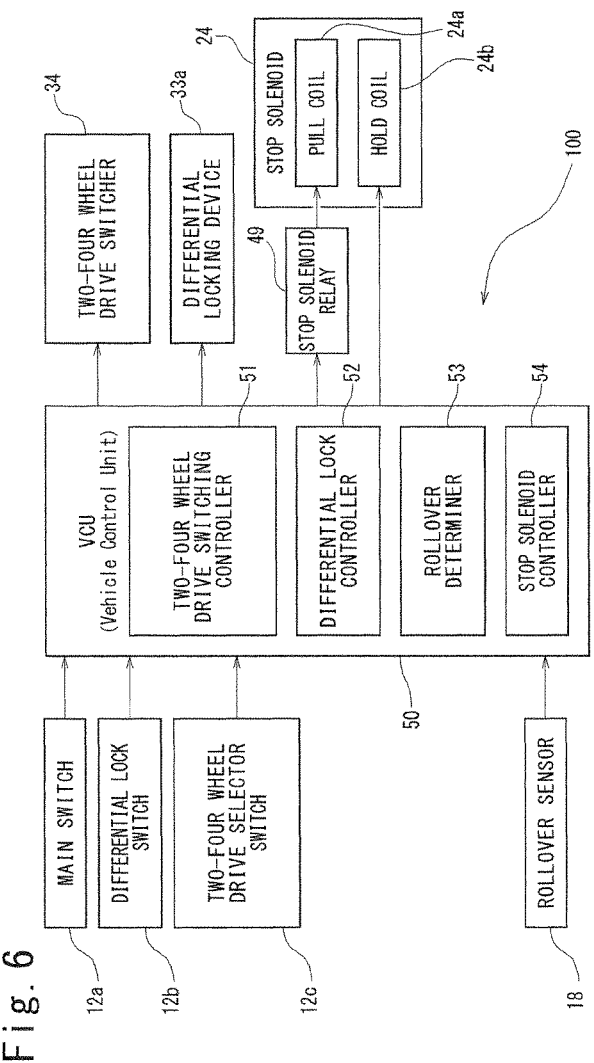
FIG. 6 is a block diagram showing a schematic configuration of a control system.

The VCU 50 will be described below with reference to FIG. 6. The VCU 50 at least includes a known computer having a CPU, a memory, a storage device, and the like, and software mounted in the computer. FIG. 6 is a block diagram showing a schematic configuration of a control system 100 including the VCU 50. The VCU 50 mainly controls operation of the drive unit 30 and includes a two-four wheel drive switching controller 51 and a differential lock controller 52, as well as a rollover determiner 53 and a stop solenoid controller 54 configured to control the stop solenoid 24.

The two-four wheel drive switching controller 51 controls the two-four wheel drive switcher 34 to switch between the four-wheel drive mode and the two-wheel drive mode in accordance with a drive mode selected by the two-four wheel drive selector switch 12c. The two-four wheel drive switching controller 51 may limit a speed region in which the drive mode is switchable from the two-wheel drive mode to the four-wheel drive mode or from the four-wheel drive mode to the two-wheel drive mode upon receipt of a signal from a vehicle speed sensor (not shown).

The differential lock controller 52 operates the differential locking device 33a when the differential lock switch 12b is turned ON (differential locking operation) to fix distribution of driving power to the right and left rear wheels 3 (see FIG. 2) by the differential device 33 (see FIG. 2) to a predetermined distribution rate. Similarly to the two-four wheel drive switching controller 51, the differential lock controller 52 may limit a speed region allowing differential lock upon receipt of a signal from the vehicle speed sensor.

The rollover determiner 53 determines rollover of the utility vehicle in accordance with an ON signal from the rollover sensor 18. Specifically, the rollover determiner 53 determines that the utility vehicle is being rolled over if the rollover sensor 18 continuously outputs an ON signal for a predetermined period. This condition prevents the utility vehicle slanted only for a short period during turning, due to a slanted road, or the like from being erroneously determined as being rolled over.

The stop solenoid controller 54 shifts the stop solenoid 24 to the retreating position or the projecting position upon receipt of a signal from the main switch 12a. Specifically, when the main switch is turned ON, the stop solenoid controller 54 shifts the stop solenoid 24 to the retreating position so as to enable fuel supply to the fuel injection pump 21. When the main switch is turned OFF, the stop solenoid controller 54 shifts the stop solenoid 24 to the projecting position so as to cut off fuel supply to the fuel injection pump 21.

More specifically, the stop solenoid 24 provided with no electricity is regularly biased toward the projecting position by a biasing device (not shown) so as to be located at the projecting position. When the main switch 12a is turned ON, the stop solenoid controller 54 controls to provide electricity to the pull coil 24a and the hold coil 24b, so that the stop solenoid 24 is shifted to the retreating position. The pull coil 24a is provided with a large amount of current from a battery (not shown) through the stop solenoid relay 49 so that the stop solenoid 24 is shifted to the retreating position by electromagnetic force. After the pull coil 24a is provided with electricity and a predetermined period elapses, provision of electricity to the pull coil 24a is cut off and the hold coil 24b keeps the stop solenoid 24 at the retreating position. In this manner, the fuel injection pump 21 can be supplied with fuel when the main switch is turned ON.

When the main switch is turned OFF, provision of electricity to the hold coil 24b is cut off and the stop solenoid 24 is shifted to the projecting position. Fuel supply to the fuel injection pump is cut off in this case and the engine 20 is thus stopped.

Also when the rollover determiner 53 determines that the utility vehicle is being rolled over while the engine 20 is in operation, the stop solenoid controller 54 controls to shift the stop solenoid 24 to the projecting position. The engine 20 can thus be stopped automatically when the utility vehicle is being rolled over.

[Operation of Control System 100]

Figure 7:
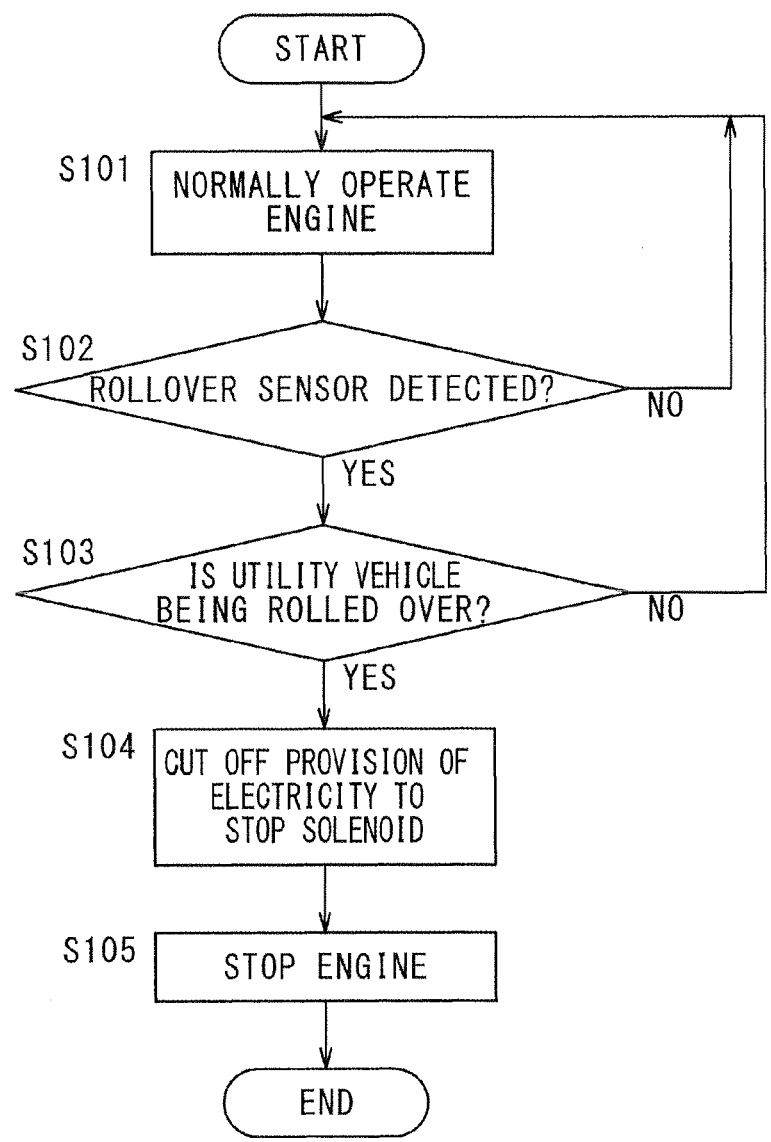
FIG. 7 is an explanatory flowchart of operation of the control system upon detection of rollover.

Operation of the control system 100 described above in a case where the utility vehicle is rolled over will now be described with reference to the flowchart in FIG. 7.

Initially in step S101, the engine 20 is running in normal operation. As described above, the pull coil 24a is not provided with electricity but only the hold coil 24b is provided with electricity, and the stop solenoid 24 is kept at the retreating position.

If the rollover sensor 18 detects rollover of the utility vehicle in this case (step S102), the rollover determiner 53 determines whether or not the utility vehicle is being rolled over in accordance with a period of detection of rollover by the rollover sensor 18 (step S103).

If the rollover determiner 53 determines that the utility vehicle is being rolled over in step S103, the stop solenoid controller 54 stops provision of electricity to the hold coil 24b of the stop solenoid 24 so as to shift the stop solenoid 24 to the projecting position (step S104).

Fuel supply from the fuel tank 22 to the fuel injection pump 21 is thus cut off and the engine 20 is stopped (step S105).

The utility vehicle thus configured can achieve the following effects.

(1) When the utility vehicle rolls over, the VCU 50 can stop the engine 20. This configuration does not require provision of a timer configured to count the predetermined period of detection by the rollover sensor 18 and an off relay configured to cut off provision of electricity to the hold relay 24b if the timer has counted the predetermined period. This configuration suppresses increase in number of the electrical equipment components to reduce location spaces for the electrical equipment components and improve location flexibility for the electrical equipment components, and achieves cost reduction.

(2) When the engine is started, the stop solenoid controller 54 cuts off provision of electricity to the pull coil 24a configured to shift the stop solenoid 24 to the retreating position after the predetermined period elapses from the start of electricity provision. This configuration does not require a timer configured to count the predetermined period while the pull coil 24a is provided with electricity, thus can further reduce location spaces for the electrical equipment components and further improve location flexibility for the electrical equipment components, and achieves further cost reduction.

(3) The electrical equipment storage box 17 and the VCU 50 are accommodated in the front chamber 14 which a periphery thereof is surrounded, so that the various electrical equipment components 40 and the VCU 50 can be protected from peripheral foreign matters particularly in a utility vehicle that is likely to travel on an unpaved road and kick up water, mud, sand, dust, and the like from the road surface. Furthermore, the rollover sensor 18 and the VCU 50 are located adjacent to each other on the front and rear surfaces of the electrical equipment storage box 17. This location enables compact wiring between the rollover sensor 18 and the VCU 50.

Second Embodiment

A utility vehicle according to the second embodiment will be described next with reference to FIGS. 8 and 9. The utility vehicle according to the second embodiment includes a control system 200 different from the control system 100 according to the first embodiment, while the remaining configurations are the same as those according to the first embodiment. The differences will be described below.

[Configuration of Control System 200]

Figure 8:
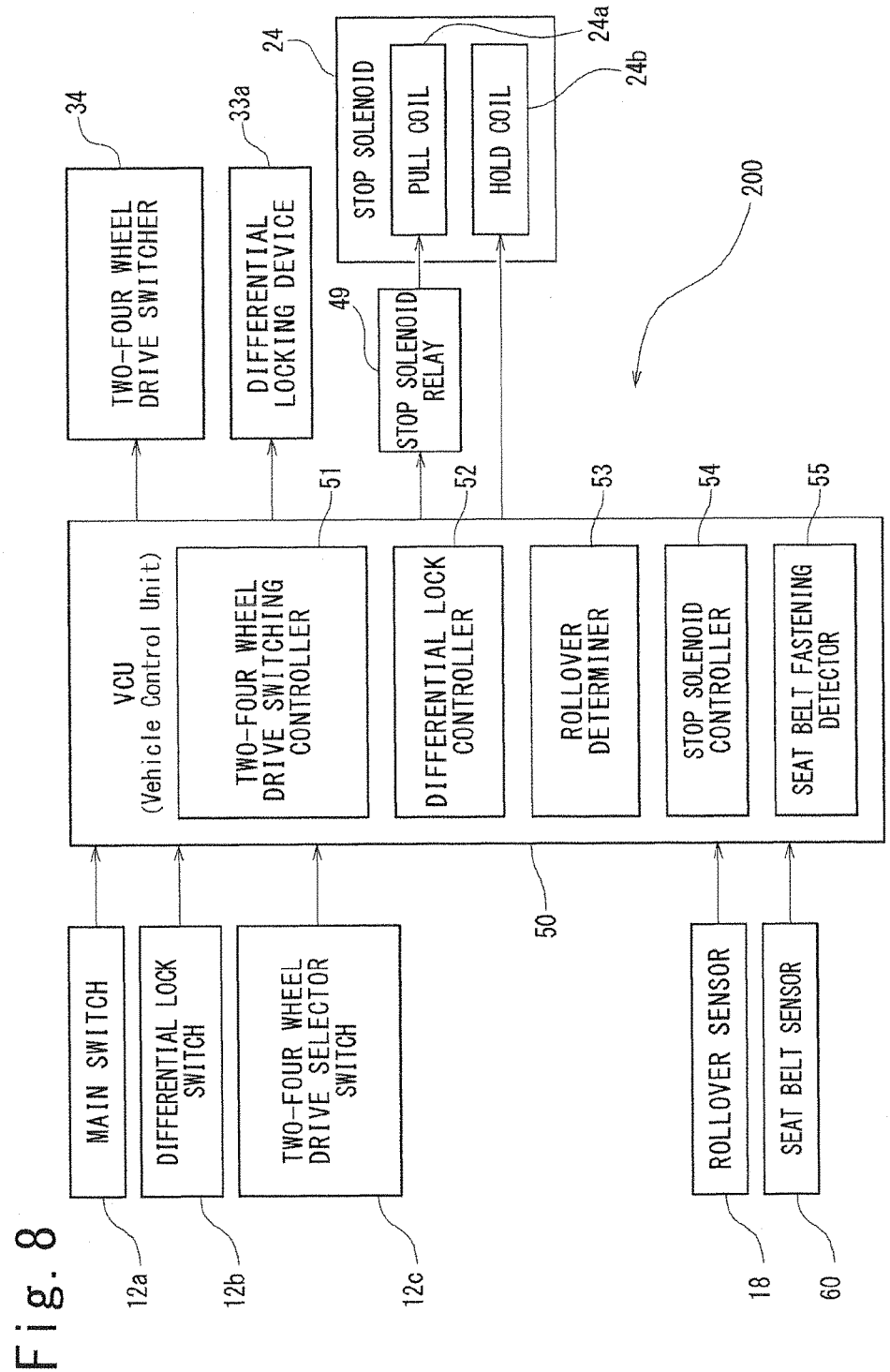
FIG. 8 is a block diagram showing a schematic configuration of a control system according to another embodiment.
Figure 9:
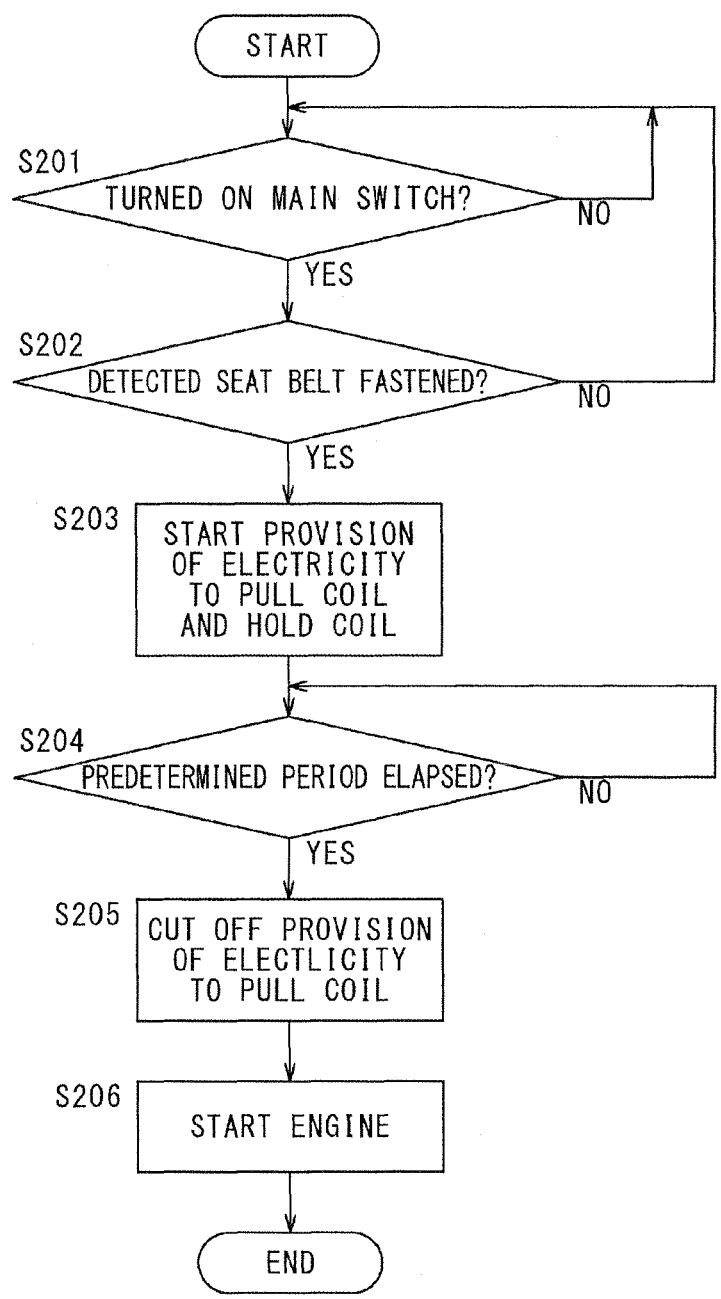
FIG. 9 is an explanatory flowchart of operation of the control system according to the other embodiment.
Figure 10A:
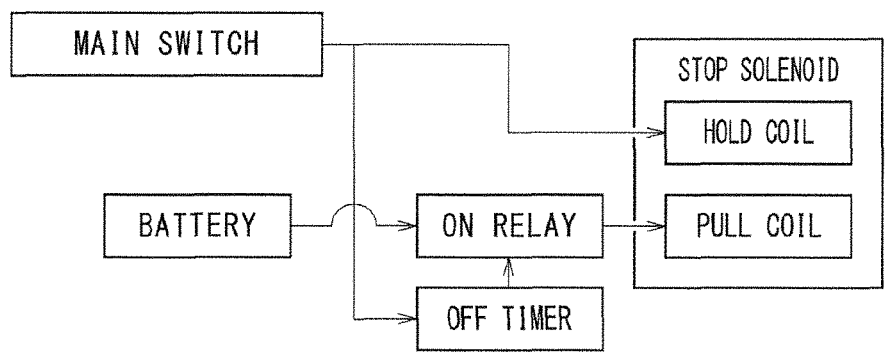
FIG. 10A is a block diagram showing a schematic configuration of a conventional control system for a stop solenoid.
Figure 10B:
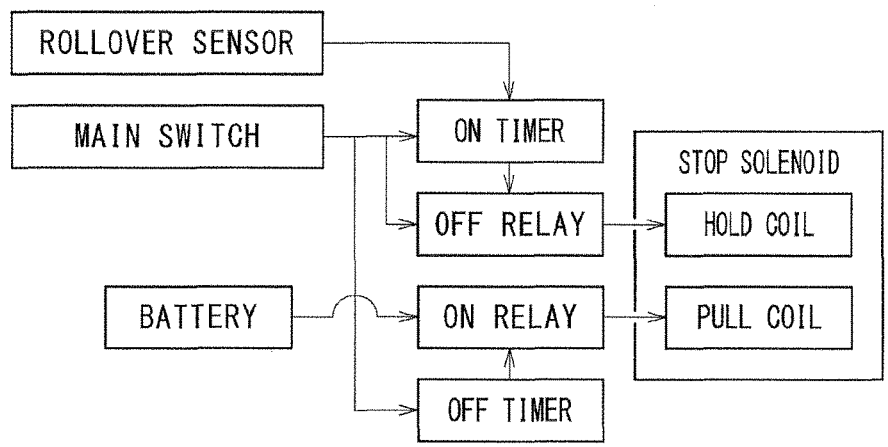
FIG. 10B is a block diagram showing a schematic configuration of a control system that is obtained by adding a rollover sensor to the control system shown in FIG. 10A.

FIG. 8 is a block diagram showing a schematic configuration of the control system 200. The control system 200 includes, in addition to the configurations of the control system 100, a seat belt fastening detector 55. When the seat belt fastening detector 55 detects that a crew does not fasten a seat belt upon receipt a signal from a seat belt sensor 60, the control system 200 controls not to start the engine 20.

Specifically, the seat belt fastening detector 55 detects that a crew does not fasten the seat belt when receiving a signal from the seat belt sensor 60 provided at the front seat 7. The seat belt sensor 60 determines whether or not the seat belt is fastened in accordance with an engagement state of a seat belt buckle.

When the seat belt fastening detector 55 detects that a crew does not fasten the seat belt, the stop solenoid controller 54 controls not to provide electricity to the pull coil 24a and the hold coil 24b and not to shift the stop solenoid 24 to the retreating position even when the main switch 12a is turned ON. Accordingly, the fuel injection pump 21 is not provided with fuel and the engine 20 is not started.

[Operation of Control System 200]

Operation of the control system 200 will now be described with reference to the flowchart in FIG. 9.

If the main switch 12a is turned ON in step S201, the seat belt fastening detector 55 determines whether or not the seat belt is fastened in step S202.

If the seat belt is determined as being fastened in step S202, the stop solenoid controller 54 provides electricity to the pull coil 24a and the hold coil 24b in step S203. The stop solenoid 24 is then shifted to the retreating position and fuel supply to the fuel injection pump 21 starts.

If the predetermined period elapses from the start of electricity provision to the pull coil 24a and the hold coil 24b in step S204, the stop solenoid controller 54 cuts off provision of electricity to the pull coil 24a in step S205. Electromagnetic force of biasing the stop solenoid 24 toward the retreating position by the pull coil 24a is then eliminated and the hold coil 24b keeps the stop solenoid 24 at the retreating position.

Subsequently in step S206, a starter (not shown) is driven to rotate and the engine 20 is started.

More specifically, the control system 200 does not allow the engine 20 of the utility vehicle to start if the seat belt is not fastened, so that the utility vehicle cannot travel when the seat belt is not fastened.

The VCU 50 configured to mainly control the drive unit 30 controls the stop solenoid 24 in the above embodiments. The VCU 50 may also control various devices and relays other than or in addition to the stop solenoid 24. For example, the VCU 50 can control a starter relay or a glow relay, or can control a meter configured to indicate travel information. This configuration does not need a timer configured to count a predetermined period while the starter or the glow operates and causes the VCU to function as the timer. This configuration can reduce location spaces for the electrical equipment components and improve location flexibility for the electrical equipment components, and achieves cost reduction by reduction in number of the components.

The present invention can be modified or changed in various manners without departing from the spirit and scope of the present invention recited in the following claims.

What is claimed is:

1. A utility vehicle comprising: a mechanically powered diesel engine without an engine control unit and no electrical control, the diesel engine being configured to be mechanically supplied with fuel by a fuel injection pump that is driven and rotated directly by rotation of a crank shaft, an amount of the supplied fuel is mechanically adjusted by a centrifugal spark advancer, and the supplied fuel is ignited by compressed self-ignition; a drive unit including a two-four wheel drive switcher provided on a driving power transmission path from the diesel engine and configured to switch transmission of driving power to driving wheels between a two-wheel drive mode and a four-wheel drive mode and/or a differential locking device; and a vehicle control unit mainly configured to control the drive unit, the utility vehicle further comprising: a rollover sensor configured to detect rollover of the utility vehicle; and a fuel cutoff valve configured to cut off fuel supply to the diesel engine, wherein the vehicle control unit determines whether or not the utility vehicle is being rolled over in accordance with detection by the rollover sensor and controls the fuel cutoff valve to cut off the fuel supply when the vehicle control unit determines that the utility vehicle is being rolled over.

2. The utility vehicle according to claim 1, wherein:
the vehicle control unit is attached to a rear surface of an electrical equipment storage box located at an upper portion in a front chamber that has a top covered with a hood and right and left sides surrounded with right and left front fenders;
the rollover sensor is accompanied in the electrical equipment storage box, and
the vehicle control unit and the rollover sensor are located adjacent to each other on the front and rear surface of the electrical equipment storage box.

3. The utility vehicle according to claim 1, further comprising:
a seat belt sensor configured to detect that an on-board crew has not fastened a seat belt, wherein the vehicle control unit does not start the engine of the utility vehicle when the seat belt sensor detects that the seat belt is not fastened.

* * * * *